(12) United States Patent
Hoe et al.

(10) Patent No.: US 6,681,659 B2
(45) Date of Patent: Jan. 27, 2004

(54) AUTOMATIC FASTENER APPARATUS AND METHOD

(75) Inventors: Shih H. Hoe, Singapore (SG); Siak S. Leow, Singapore (SG); Muhammad F. Abdullah, Singapore (SG); Hua K. Lee, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 16 days.

(21) Appl. No.: 10/024,688

(22) Filed: Dec. 17, 2001

(65) Prior Publication Data

US 2002/0129679 A1 Sep. 19, 2002

Related U.S. Application Data

(60) Provisional application No. 60/275,729, filed on Mar. 14, 2001.

(51) Int. Cl.$^7$ ............................................. B25B 13/00
(52) U.S. Cl. .............. 81/54; 81/52; 81/57; 81/57.11; 81/57.24; 81/451
(58) Field of Search ....................... 81/52, 54, 57, 81/57.11, 57.24, 57.4, 57.42, 451, 456, 457

(56) References Cited

U.S. PATENT DOCUMENTS

| | | | | | |
|---|---|---|---|---|---|
| 1,386,455 A | * | 8/1921 | Clemens | ...................... | 81/469 |
| 1,807,591 A | * | 6/1931 | Fleischli et al. | ............... | 29/240 |
| 4,287,498 A | * | 9/1981 | Gaddy | ......................... | 334/74 |
| 4,483,219 A | * | 11/1984 | Sticht et al. | ............... | 81/57.14 |
| 5,178,045 A | * | 1/1993 | Frizot | ........................... | 81/54 |
| 5,178,046 A | * | 1/1993 | Matsumoto et al. | ........ | 81/57.14 |
| 5,423,371 A | * | 6/1995 | Landua et al. | ............... | 164/137 |
| 5,553,519 A | * | 9/1996 | Pettit, Jr. | ........................ | 81/56 |
| 6,247,387 B1 | * | 6/2001 | Ketteringham | ............... | 81/467 |
| 6,288,356 B1 | * | 9/2001 | Harder et al. | ............. | 219/86.25 |
| 6,519,836 B2 | * | 2/2003 | Watanabe et al. | .............. | 29/714 |

* cited by examiner

Primary Examiner—Joseph J. Hail, III
Assistant Examiner—Alvin J. Grant
(74) Attorney, Agent, or Firm—Mitchell K. McCarthy (57) ABSTRACT

An apparatus and associated method for automatically installing a fastener to a fastener receptacle portion of a work piece. A fastener apparatus comprises a central frame supporting a datum member. The datum member defines a fastener position, and the datum member is operably engageable with a characteristic feature of the work piece. The fastener apparatus further comprises a fastening tool supported by the frame and moveable to the fastener position. The fastener apparatus further comprises a biasing member biasing the work piece characteristic feature in operable engagement with the datum member aligning the fastener receptacle with the fastener position.

29 Claims, 7 Drawing Sheets

AUTOMATIC FASTENER APPARATUS AND METHOD

CROSS REFERENCE TO RELATED APPLICATIONS

This application claims the benefit of U.S. Provisional Application No. 60/275,729. filed date Mar. 14, 2001.

FIELD OF THE INVENTION

This invention relates generally to the field of automatic fastening devices and associated methods, and more particularly but not by way of limitation to an apparatus and associated method suited for continuous flexible fabrication processes involving installing fasteners in a variety of work pieces by biasing the work piece in operable engagement with a replaceable datum member corresponding to the work piece.

BACKGROUND OF THE INVENTION

To be competitive, manufacturers generally have transitioned from batch processing of parts and assemblies to just-in-time processing approaches. Maximum throughput requires speed and flexibility in each step of the manufacturing process. But these two objectives, speed and flexibility, can be mutually exclusive. For example, dedicated tooling, or hard tooling, approaches optimize machine utilization but negatively affect flexibility. Conversely, flexible tooling, or soft tooling, approaches optimize flexibility but negatively affect velocity through the manufacturing process. Typically, the complexity and volume of a component or assembly determines whether hard or soft tooling approaches, or some combination thereof, best supports the throughput requirement.

Fastener attachment is an example of a manufacturing assembly process where there is a long-felt need for improvement. More traditional solutions have involved locating a work piece to be joined with fasteners in a carrier, or fixture, and indexing or conveying the work piece operably adjacent the fastening tool. In this arrangement, the carrier establishes the datum references for the work piece. That is, the carrier orients the work piece so as to define the fastener positions. The fastening tool is configured to install the fasteners at the positions predetermined by the carrier. Maintaining the datum is relatively critical for a fastener install operation, especially with regard to threaded fastener operations where the screw must engage the corresponding fastener receptacle squarely for a proper threading engagement. Maintaining the datum by the carrier complicates several aspects such as the carrier design, the picking and placing of work pieces to and from the carrier, and the movement of the carrier between manufacturing operations.

More recent solutions involve relaxing the datum requirement of the carrier and providing smart tool approaches that can relatively determine the fastener receptacle position. U.S. Pat. No. 4,562,756 issued to Otsuki et al., for example, describes the use of a moveable fastening tool responsive to an ultrasonic detector which can detect the fastener receptacle. This type of solution is relatively complex, expensive, and slow especially with regard to the fine positioning movement of the carrier and/or the fastening tool in response to the detector devices.

It has been determined that a simpler and faster solution lies in establishing the datum by a datum member portion of the assembly machine instead of the carrier. The work piece can be roughly positioned by the carrier and finely positioned by moving the work piece from the carrier, or with the carrier, into operable engagement with the datum member. By making the datum member easily removable and replaceable with a different datum member, a variety of different work pieces can be processed. It is to this and other improvements as exemplified by the description and appended claims that embodiments of the present invention are directed.

SUMMARY OF THE INVENTION

The embodiments of the present invention contemplate an apparatus and associated method for installing a fastener to a fastener receptacle portion of a work piece. In one aspect of the embodiments of the present invention an automatic fastener apparatus comprises a central frame supporting a datum member. The datum member defines a fastener position, and the datum member is operably engageable with a characteristic feature of the work piece. The fastener apparatus further comprises a fastening tool supported by the frame and moveable to the fastener position. The fastener apparatus further comprises a biasing member biasing the work piece characteristic feature in operable engagement with the datum member aligning the fastener receptacle with the fastener position.

The work piece can consist of one or more component parts to be joined by the fastener, and a carrier containing the components. In one embodiment the datum member operably engages a characteristic feature of the carrier. Preferably, the datum member is removably attached to the frame, such as by a threaded fastener, making the fastener apparatus convertible for use with a variety of work pieces.

The fastening apparatus can further comprise a programmable controller controlling the fastening tool movement, and controlling a conveyor moving the work piece into the frame.

In one embodiment the fastener apparatus datum member comprises a fixed locating pin operably engageable with a characteristic feature of the work piece. In one embodiment the fastener apparatus datum member comprises a fixed locating pin operably engageable with a characteristic feature of the carrier. In one embodiment the fastener apparatus datum member comprises a retractable locating member operably engageable with a characteristic feature of the work piece.

In one aspect of the embodiments of the present invention a method is contemplated for automatically attaching a fastener to a fastener receptacle portion of a work piece, comprising: providing a fastening apparatus comprising a fastening tool moveable relative to a datum member defining a fastener position; moving the fastening tool to the fastener position; biasing the work piece in operable engagement with the datum member to align the fastener receptacle with the fastener position; and activating the fastening tool to engage the fastener within the fastener receptacle.

These and various other features as well as advantages which characterize the present invention will be apparent upon a reading of the following detailed description and review of the associated drawings.

DETAILED DESCRIPTION

Figure 1:
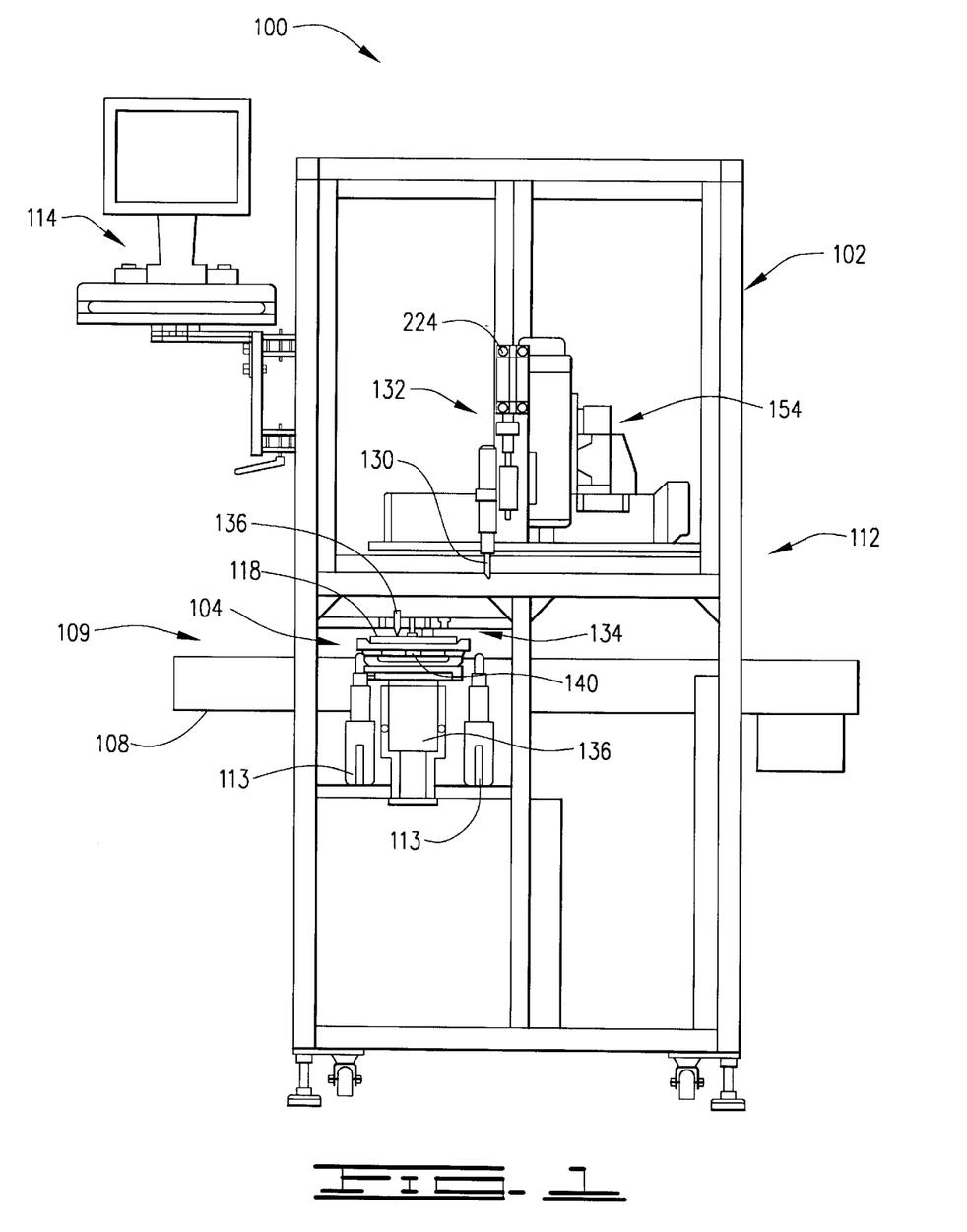
FIG. 1 is an elevational view of an automatic fastener apparatus constructed in accordance with an embodiment of the present invention.

Referring to the drawings in general, and more particularly to FIG. 1, shown therein is an elevational view of an automatic fastener apparatus 100 constructed in accordance with an embodiment of the present invention. The fastener apparatus 100 comprises a central structural frame assembly 102 affording skeletal support of various components described hereinbelow.

The frame 102 defines a staging area 104 that receives a work piece requiring one or more fasteners. In one embodiment a conveyor assembly 108 transports the work piece from an upstream side 109 of the frame 102 into the staging area 104. The conveyor 108 can also transport the work piece from the staging area 104 to a downstream side 112 of the frame 102. Limit switches 113 can control movement into and out of the staging area 104. A processor 114 controls the apparatus 100 in a desired sequence to move the work piece and install the fasteners, as described hereinbelow.

Figure 2:
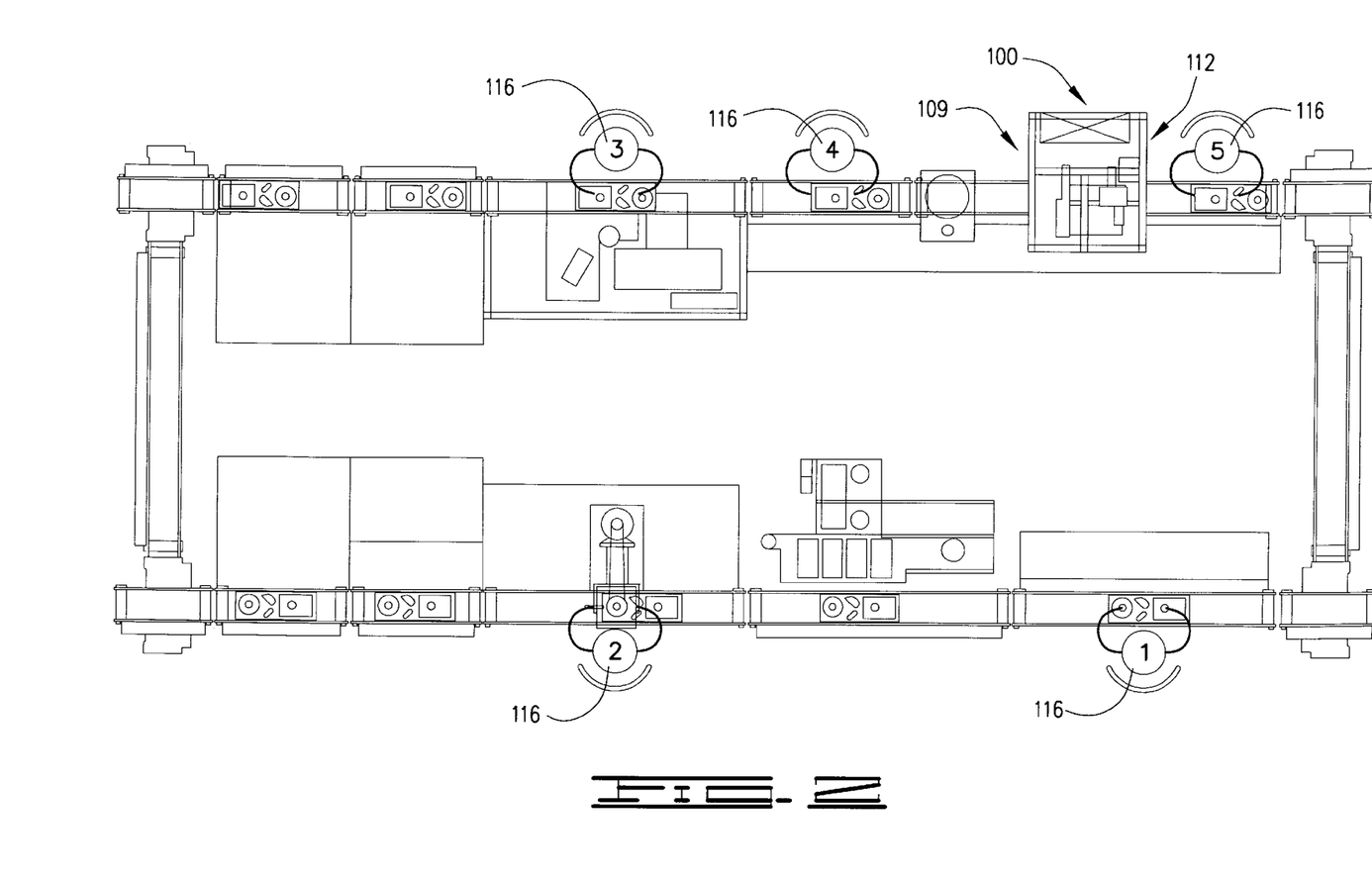
FIG. 2 is a plan view of an automated assembly line comprising the automated fastener apparatus of FIG. 1.

The apparatus 100 as shown in FIG. 1 is a modular unit that is readily joinable with other similar manufacturing units to form a continuous in-line manufacturing operation. For example, FIG. 2 illustrates an automated assembly line similar to that of U.S. Pat. No. 6,105,240 issued to Chuang et al. ("Chuang '240") for use in assembling a data storage disc drive device. In the Chuang '240 patent a final assembly operation of attaching a cover to a base (see below) is done manually by a human operator. In FIG. 2, however, the fastener apparatus of FIG. 1 performs that operation, thus reducing the number of assembly operators 116 on the assembly line from six to five.

Figure 3:
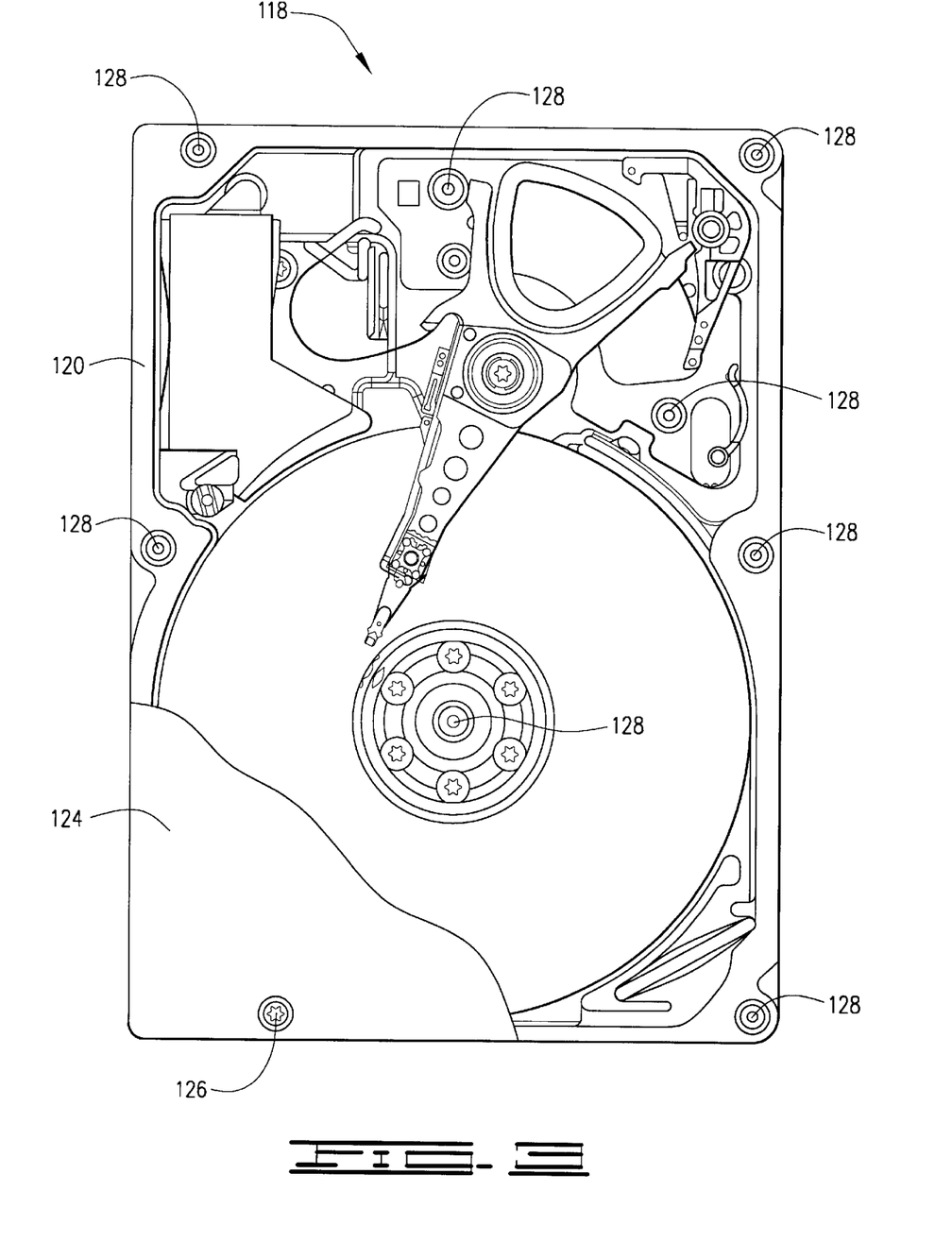
FIG. 3 is a plan view of a disc drive suited for automatic processing by the apparatus of FIG. 1.

FIG. 3 illustrates a top view of a disc drive 118 which is well adapted for assembly by the automated assembly line of FIG. 2. The disc drive 118 has a base 120 and a cover 124 (partially broken away) which are joined by a plurality of fasteners 126 that engage fastener receptacles 128 in the base 120. In one embodiment the fasteners 126 are characteristic of the threaded type and the receptacles 128 are likewise threaded. The automated installation of the fasteners 126 to join the cover 124 and base 120 in the disc drive 118 is a specific example used in the following only to describe the general structure and methodology of the automatic fastening apparatus 100 of the present invention. Such example is illustrative and not limiting of the contemplated uses of the apparatus 100 which can virtually be used in any type of automated assembly line and with a variety of different joining methods, such as but not limited to rivets, clamps, staples, welds, and the like.

Returning to FIG. 1, the apparatus 100 comprises a fastening tool 130 supported by the frame 102 and moveable to selected positions. In one embodiment as illustrated in FIG. 1 the fastening tool 130 is supported by a programmable three-axis robot 132. The apparatus 100 further comprises a datum member 134 supported by the frame 102 defining one or more fastener positions. The datum member 134 is operably engageable with a characteristic feature of the work piece, in a manner such as described further hereinbelow. The apparatus 100 further comprises a biasing member 136 which biases the work piece characteristic feature in operable engagement with the datum member 134, thereby aligning the fastener receptacle of the work piece with the fastener position defined by the datum member 134. FIG. 1 illustrates, for example, a biasing member 136 comprising a fluid cylinder with an extensible shaft 140 for lifting the work piece upwardly against the datum member 134.

Figure 4:
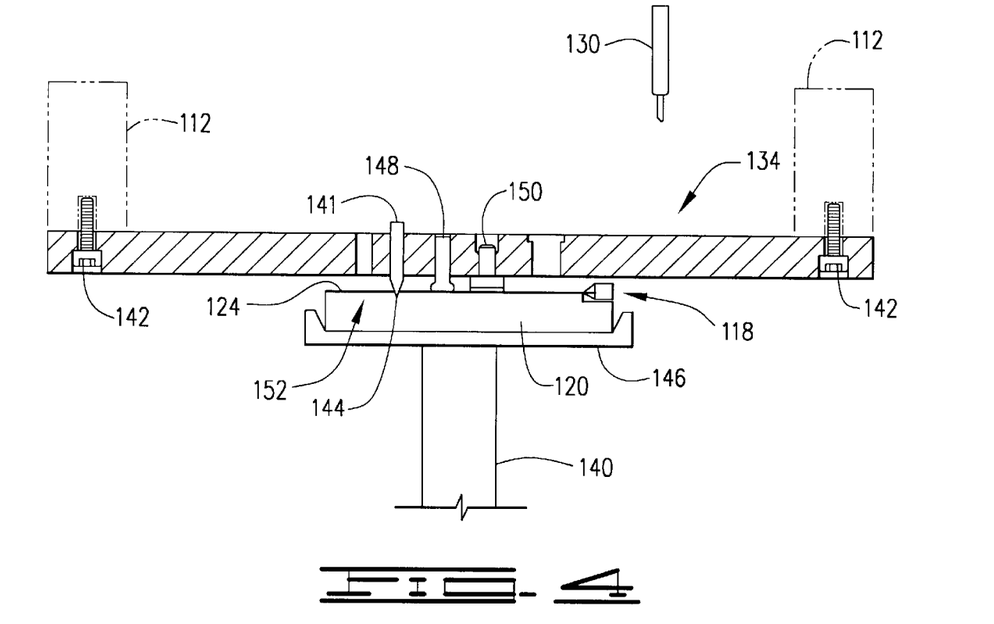
FIG. 4 is an enlarged detail of a portion of the apparatus of FIG. 1 illustrating the disc drive moved into operable engagement with the datum member.

FIG. 4 is an enlarged view of a portion of the apparatus 100 of FIG. 1. The datum member 134 comprises a locating plate 138 and one or more fixed locating pins 141. Preferably the locating plate 138 is removably attached to the frame 102, such as by one or more threaded fasteners 142. Thus, the datum member 134 is readily replaceable with one of a different configuration so as to convert the apparatus 100 for use with a different work piece.

The fixed locating pin 141 has a distal end 144 that is operably engageable with a characteristic feature of the work piece, such as with the disc drive 118 in the present example. For example, one or more of the fixed locating pins 141 can be located so as to be receivingly engaged within one or more of the respective fastener receptacles 128. The disc drive 118 can be nested within a carrier 146 in which it is supported while being moved through the manufacturing processes. For purposes of this description the work piece can be the components being joined by the fasteners, such as the disc drive 118, and the carrier containing the components, such as carrier 146. The disc drive 118 is free to shift laterally relative to the carrier 146 as the fixed locating pins 141 engage the respective characteristic features of the disc drive 118. In this manner the carrier 146 merely roughly positions the disc drive 118, and can thus be made of a relatively simple and inexpensive construction. Likewise, the associated picking and placing of the disc drive 118 to the carrier 146 is relatively simplified.

The biasing member 136 in FIG. 1 moves the work piece, or the disc drive 118 and carrier 146, longitudinally against the datum member 134 to maintain the longitudinal datum. To more positively maintain the longitudinal datum a positive stop 148 can be provided to abuttingly engage the disc drive 118 in opposition to the biasing member 136. In FIG. 4 the positive stop 148 is supported by the locating plate 138; alternatively, the stop 148 can depend directly from the frame 102. In either case, the stop 148 can extend as a substantially rigid abutment, or it can be provided with a damping response to minimize the shock that is transmitted to the disc drive 118.

A sensor can also be provided to more positively maintain the longitudinal datum. For example, FIG. 4 illustrates a proximity type sensor 150 that indicates when the disc drive 118 has been moved so as to achieve the longitudinal datum. The signal indication can be used to control the biasing member 136 as well as a lockout for subsequent operations. The sensor 150 is shown depending from the locating plate 138, but likewise can be supported by the frame 102.

Figure 5:
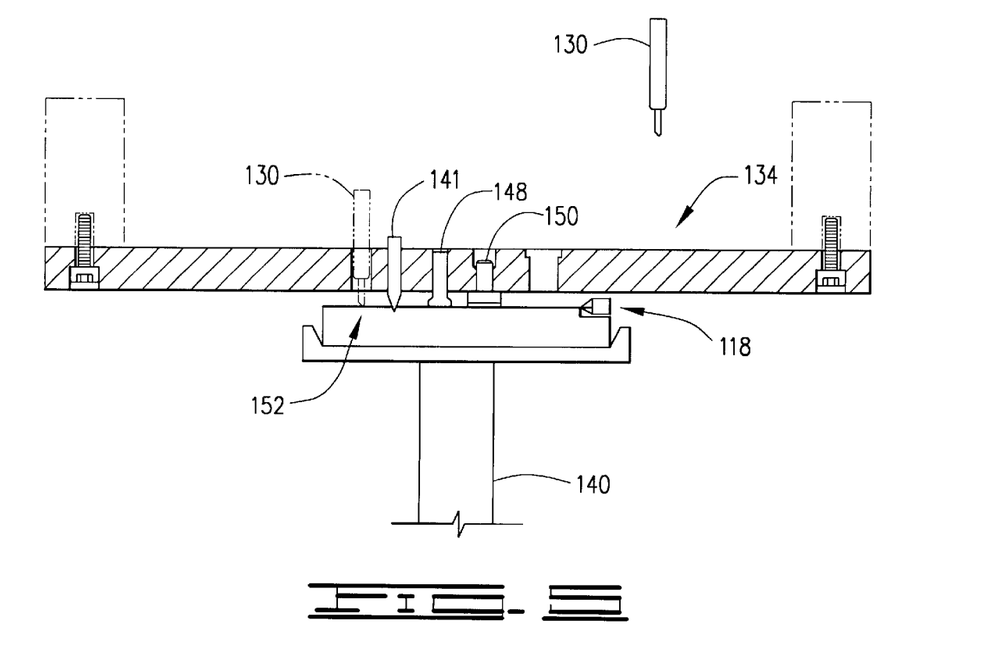
FIG. 5 is a view similar to FIG. 2 illustrating the fastening tool moved to a fastener position.

With the disc drive 118 biased in operable engagement with the datum member 134, the fastening tool 130 is moved to one or more fastener positions such as fastener position 152 in FIG. 5. There the fastening tool 130 automatically receives a fastener, such as from a conventional fastener feeder assembly 154 (FIG. 1), and installs the fastener to join the cover 124 and base 120.

Figure 6:
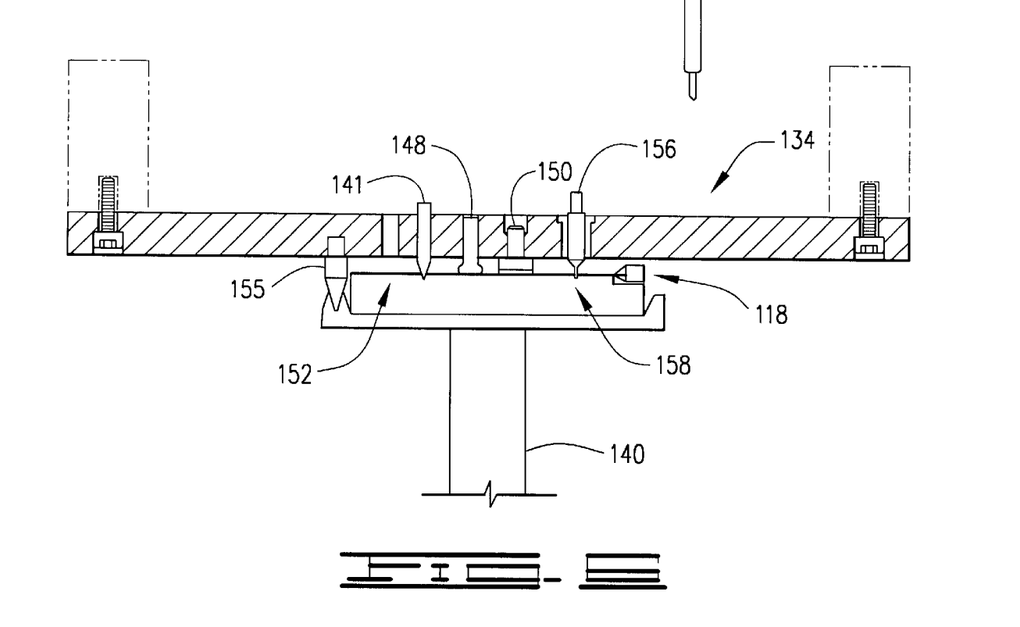
FIG. 6 is a view similar to FIG. 2 illustrating the datum member engaging a characteristic feature of the carrier.
Figure 7:
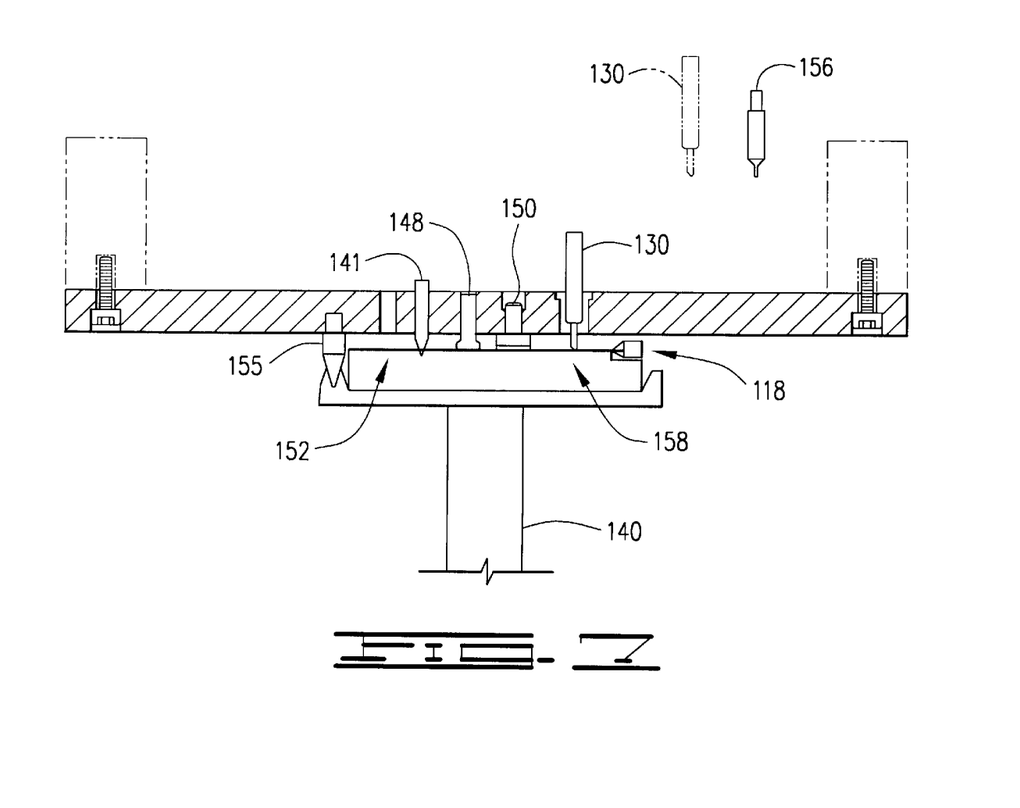
FIG. 7 is a view similar to FIG. 2 illustrating the retractable locating member in the withdrawn position and the fastening tool moved to the fastener position.

FIG. 6 illustrates additional and/or alternative approaches for biasing the disc drive 118 in operable engagement with the datum member 134. A fixed locating member 155 can be provided to operably engage a characteristic feature of the carrier instead of the disc drive 118. Also, a retractable locating pin 156 can be supported by a linkage mechanism having an extended mode and a retracted mode. In the extended mode the retractable locating pin 156 is receivingly engaged within a characteristic feature, such as a fastener receptacle 128, to align a fastener position 158 with the datum member 134. In the retracted mode as shown in FIG. 7 the retractable locating pin 156 is clearingly retracted from the fastener position 158 so that the fastening tool 130 can install a fastener at a fastener position 158.

Figure 8A:
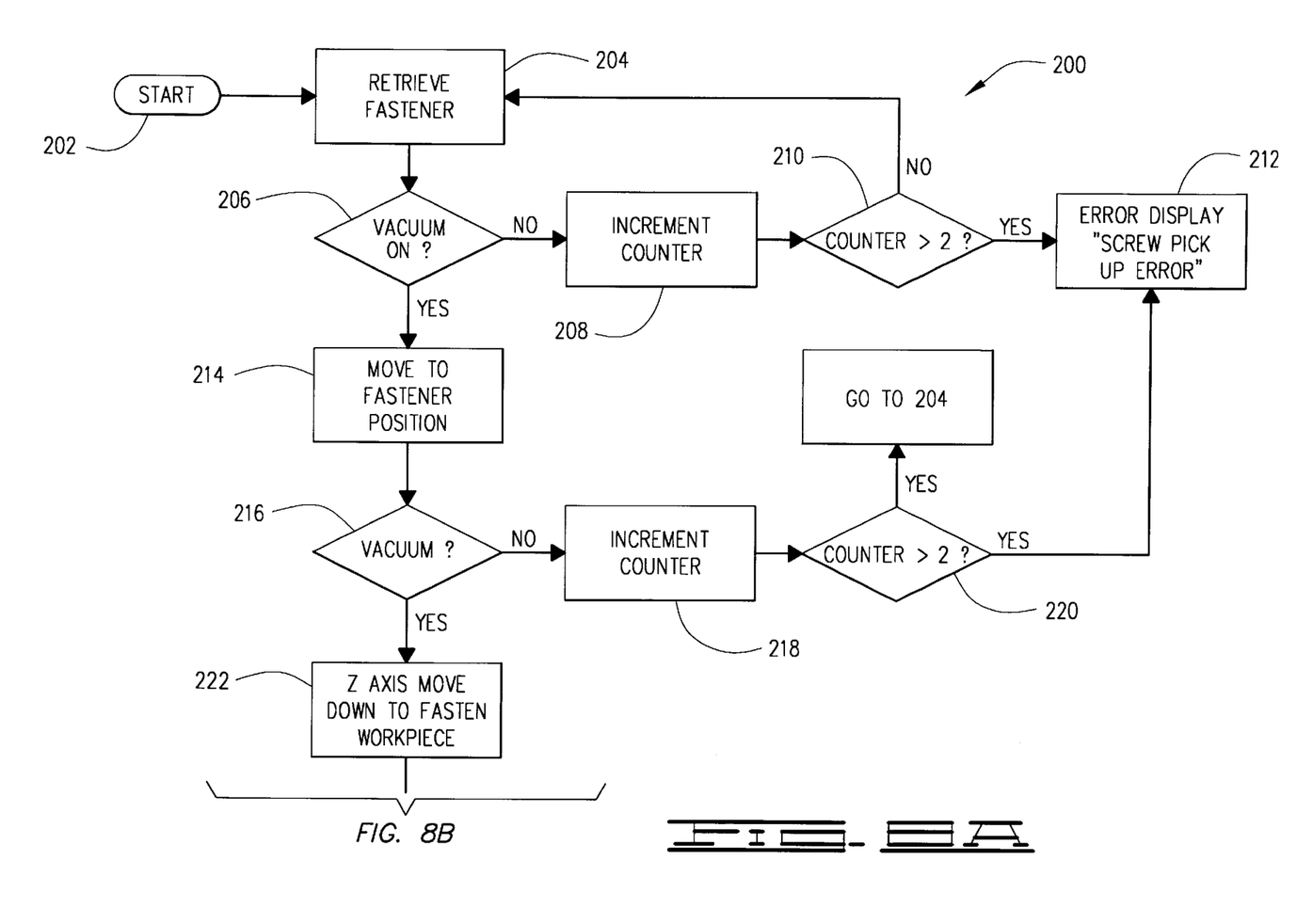
FIG. 8 is a flow chart of a method of fastening in accordance with an embodiment of the present invention.
Figures 8A, 8B:
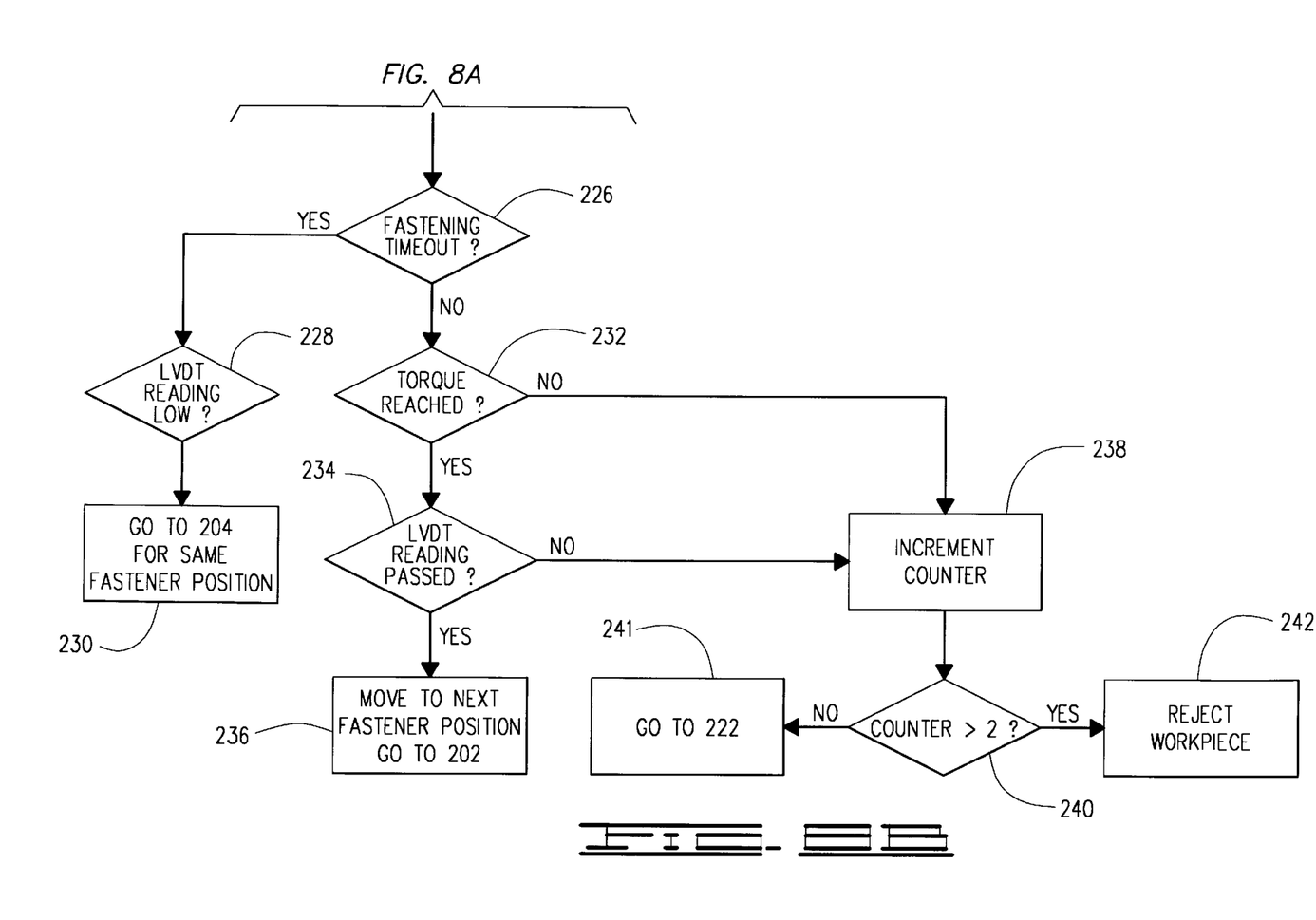

The automatic fastener apparatus 100 is controlled by the processor 114 in part to provide a closed-loop system for verfying that each fastener is properly installed. The flow chart of FIG. 8 illustrates a portion of that system 200 which begins at block 202 when the control system is initiated by a call for a fastener by the fastening tool 130 (FIG. 1). The start block 202 also initializes the system by resetting parameters and counters as necessary. Control passes to block 204 which initiates retrieving a fastener from the feeder assembly 154 (FIG. 1). The vacuum assist with which the fastening tool grasps the fastener is verified in block 206. If no vacuum, or insufficient vacuum is detected then a counter is incremented at block 208. If the counter 208 is determined by block 210 to be greater than a desired number, such as two, then the control system locks out and an error message is displayed by block 212. If not, then control returns to block 204.

If sufficient vacuum is detected by block 206, then the fastening tool is moved to the fastening position in block 214, such as by activating the three-axis robot 132 (FIG. 1). Again, the vacuum can be verified by block 216 and if determined to be insufficient a counter is incremented in block 218. If the counter 218 is determined by block 220 not to be greater than a desired number, such as two, then control returns to block 204. Otherwise, the control system locks out and an error message is displayed by block 212.

If sufficient vacuum is detected by block 216, then the fastening tool is rotated and moved downwardly in block 222 to install the threaded fastener. The fastening tool can be supplied with a conventional linear variable differential transformer (LVDT) 224 (FIG. 1) to indicate the longitudinal z-axis displacement. A timer limit is monitored in block 226 which, if exceeded, queries the LVDT in block 228 to determine if the z-axis displacement is less than a lower threshold value. If so, then the fastener install control system 200 returns to block 204 for the same fastener position in block 230.

If the timer limit is not exceeded in block 226 then the control system 200 queries the fastening tool 130 for the torque reached during fastener installation in block 232. If the actual torque is equal to or greater than a preselected threshold, then control passes to block 234 where the LVDT reading is queried to determine if it is above a preselected threshold. If so, the process is complete for that fastener and control passes to block 236 wherein the fastening tool is moved to the next fastener position and control passes to block 202.

If the actual torque detected by block 232 is not equal to or greater than the preselected threshold then a counter is incremented at block 238. If the counter 238 is detected by block 240 not to be greater than a preselected number, such as two, then block 241 returns control to block 222. If the counter 238 is detected as exceeding the limit in block 240 then the system 200 locks out and rejects the work piece in block 242.

In summary, an automatic fastener apparatus 100 for joining components of a work piece (such as 118) comprises a central supporting frame (such as 102) supporting, in turn, a datum member (such as 134) which defines a fastener position. The datum member is engageable with a characteristic feature of the work piece (such as 128). The automatic fastener apparatus further comprises a fastening tool supported by the central frame in a manner so as to be moveable to the fastener position. The automatic fastener apparatus furthermore comprises a biasing member biasing the work piece characteristic feature in operable engagement with the datum member to align the work piece with the fastener position.

Preferably, the datum member is removably attached to the frame by removable fasteners (such as 142) so that differently configured datum members can be used in conjunction with a variety of different work pieces.

The datum member comprises one or more locating members to operably align the work piece. In one embodiment the datum member comprises one or more fixed locating pins (such as 141) that operably engage characteristic features of the work piece (such as 128). In another embodiment the datum member comprises one or more fixed locating pins (such as 155) that operably engage characteristic features of the carrier in which the work piece is supported. In another embodiment the datum member comprises one or more retractable locating pins (such as 156) that can operably engage either the work piece or the carrier.

A control system (such as 200) provides closed-loop control to ensure each fastener is installed properly. Fastening cycle time is monitored (such as 226) as well as longitudinal thread engagement (such as 228, 234) and torque (such as 232). If preselected parameters are not observed the control system locks out and rejects the work piece (such as 242).

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the type and arrangement of fasteners used may vary while maintaining substantially the same functionality without departing from the scope and spirit of the present invention. In addition, although the preferred embodiment described herein is directed to a data storage device, it will be appreciated by those skilled in the art that the teachings of the present invention can be applied to other work pieces which can be automatically assembled, without departing from the scope and spirit of the present invention.

What is claimed is:

1. An automatic fastener apparatus for installing a threaded fastener to a threaded receptacle portion of a work piece, comprising:
   a central frame;
   a datum member supported by the frame defining a threaded fastener position, the datum member operably engageable with a characteristic feature of the work piece;

a fastening tool supported by the central frame and moveable to the threaded fastener position; and a biasing member biasing the work piece characteristic feature in operable engagement with the datum member aligning the threaded receptacle with the threaded fastener position before the threaded fastener enters the threaded fastener position.

2. The apparatus of claim 1 wherein the work piece consists of one or more component parts to be joined by the fastener, and a carrier containing the components, and wherein the datum member operably engages a characteristic feature of the carrier.

3. The apparatus of claim 1 wherein the datum member is removably attached to the frame by a threaded fastener.

4. The apparatus of claim 1 further comprising a programmable controller controlling the fastening tool movement.

5. The apparatus of claim 1 further comprising a conveyor moving the work piece within the frame.

6. The apparatus of claim 1 wherein the datum member comprises a plate comprising a first surface adjacent the fastening tool, and an opposing second surface adjacent the work piece, the plate comprising a surface defining an opening communicating with the first and second surfaces for passage of the fastening tool at the fastener position.

7. The apparatus of claim 6 comprising surfaces defining two or more openings communicating with the first and second surfaces for passage of the fastening tool at different fastener positions.

8. The apparatus of claim 4 wherein the fastening tool is supported by a three-axis robot responsive to the controller.

9. The apparatus of claim 1 wherein the biasing member comprises a fluid cylinder with an extensible shaft moving the carrier and, in turn, operably engaging the work piece with the datum member.

10. The apparatus of claim 1 wherein the datum member comprises a fixed locating pin operably engageable with a characteristic feature of the work piece.

11. The apparatus of claim 2 wherein the datum member comprises a fixed locating pin operably engageable with a characteristic feature of the carrier.

12. The apparatus of claim 1 wherein the datum member comprises a retractable locating member operably engageable with a characteristic feature of the work piece.

13. The apparatus of claim 1 further comprising a sensor indicating when the work piece is operably engaged with the datum member.

14. The apparatus of claim 1 further comprising a positive stop abuttingly engaging the work piece in opposition to the biasing member.

15. The apparatus of claim 14 wherein the positive stop comprises a damping member.

16. A method for automatically attaching a threaded fastener to a threaded receptacle portion of a work piece, comprising:

providing a fastening apparatus comprising a fastening tool moveable relative to a datum member defining a fastener position;

moving the fastening tool to the fastener position;

biasing the work piece in operable engagement with the datum member at a location other than the fastener position to align the threaded receptacle with the fastener position;

activating the fastening tool to engage the fastener within the receptacle.

17. The method of claim 16 wherein the work piece consists of one or more component parts to be joined by the fastener, and a carrier containing the components, and wherein the datum member operably engages a characteristic feature of the carrier.

18. The method of claim 16 further comprising replacing the datum member with another datum member having a different configuration for operable engagement aligning a different work piece.

19. The method of claim 15 further comprising moving a retractable locating member to operable engagement with a characteristic feature of the work piece, aligning the fastener receptacle with the fastener position.

20. An automatic fastening apparatus for attaching a threaded fastener to a threaded receptacle portion of a work piece, comprising:

a frame supporting a fastening tool relative to a datum member, the datum member defining a fastener position; and means for aligning the threaded receptacle and the fastener position before moving the fastening tool to the fastener position and attaching the fastener.

21. The apparatus of claim 20 wherein the means for aligning comprises a datum member defining a fastener position, the datum member operably engageable with a characteristic feature of the work piece.

22. The apparatus of claim 21 wherein the means for aligning comprises a fastening tool moveable to the fastener position, and a biasing member biasing the work piece characteristic feature in operable engagement with the datum member aligning the fastener receptacle with the fastener position.

23. The apparatus of claim 21 wherein the work piece consists of one or more component parts to be joined by the fastener, and a carrier containing the components, and wherein the datum member operably engages a characteristic feature of the carrier.

24. The apparatus of claim 21 wherein the datum member comprises a fixed locating pin operably engageable with a characteristic feature of the work piece.

25. The apparatus of claim 22 wherein the datum member comprises a fixed locating pin operably engageable with a characteristic feature of the carrier.

26. The apparatus of claim 21 wherein the datum member comprises a retractable locating member operably engageably with a characteristic feature of the work piece.

27. The apparatus of claim 21 further comprising a sensor indicating when the work piece is operably engaged with the datum member.

28. The apparatus of claim 21 further comprising a positive stop abuttingly engaging the work piece in opposition to the biasing member.

29. The apparatus of claim 28 wherein the positive stop comprises a damping member.

* * * * *